United States Patent
Kucera

[11] Patent Number: 5,901,734
[45] Date of Patent: May 11, 1999

[54] ADJUSTABLE BURY TANK FOR WATER SYSTEM

[75] Inventor: William Dale Kucera, Ravenna, Nebr.

[73] Assignee: K & M Industries, Ravenna, Nebr.

[21] Appl. No.: 08/853,403

[22] Filed: May 9, 1997

Related U.S. Application Data

[60] Provisional application No. 60/032,483, Dec. 9, 1996.

[51] Int. Cl.⁶ .................................................. F04F 1/06
[52] U.S. Cl. ................................... 137/209; 137/202
[58] Field of Search ..................... 137/202, 209

[56] References Cited

U.S. PATENT DOCUMENTS

| 1,538,049 | 5/1925 | Mack | 137/202 |
| 3,733,449 | 5/1973 | Parker | 137/209 X |
| 5,485,865 | 1/1996 | Shirk | 137/202 X |

*Primary Examiner*—Gerald A. Michalsky
*Attorney, Agent, or Firm*—Suiter & Associates PC

[57] ABSTRACT

A water supply system which includes an adjustable bury pressure tank having an adjustable float pump control assembly. The water supply system may be adapted for use in a wide variety of climatic conditions.

23 Claims, 6 Drawing Sheets

ADJUSTABLE BURY TANK FOR WATER SYSTEM

CROSS REFERENCE TO RELATED APPLICATIONS

The present application claims the benefit, under 35 U.S.C. § 119(e), of U.S. Provisional application Ser. No. 60/032,483, filed Dec. 9, 1996. Said Provisional application Ser. No. 60/032,483 is herein incorporated by reference in its entirety.

TECHNICAL FIELD

The present invention is generally related to water well systems designed to provide water service to a dwelling or the like and more particularly to a water well system having a buried pressure tank wherein tank bury depth is adjustable.

BACKGROUND OF THE INVENTION

Rural dwellings, and the like, not connected to a central or "city" water supply system utilize a water well and related system apparatus to provide water service. Such systems generally include a water well consisting of a vertical shaft extending from the service to some distance below the water line (generally into an underground aquifer or other water-bearing formation). This shaft is lined by a casing pipe having an annular space surrounding a water pipe. A pump is connected to the water pipe below the water level within the casing pipe.

In one prior art system, water is pumped through the water pipe into the plumbing system of the dwelling or the like. In another prior art system, the water pipe is connected to a pit within an insulated enclosure wherein the pit is utilized to feed the plumbing system. In still another prior art system, the water pipe is connected to a pitless unit which may or may not be housed within a pressure tank.

Systems employing pressure tanks may be housed in an insulated enclosure, or may be buried below the frost line. The depth of the frost line will vary depending on the climate in which the system is employed. Therefore, it would be desirable to provide a pressure tank for a water system, that may be buried in the ground at various depths.

In order to pressurize a water system and supply a volume of water to a location, a water tank capable of being pressurized is needed. To pressurize water in a tank, some portion of the tank volume must be air, which stores the pressure energy. In a typical application, approximately one half of the tank may be filled with water and one half filled with air.

One drawback to such a system is that the air in the tank is absorbed by the water, thereby dissipating the potential energy stored by the pressurized air, and eventually allowing the tank to become full of water, thus preventing further pressurization.

One method to overcome this problem is to periodically pressurize the tank externally using pressurized air to get the water level back to its optimum level. This method is troublesome, time consuming. The period of time between external pressurization depends on water usage, however, periods of approximately once per month are typical.

Another method of overcoming the problems associated with the loss of air pressure due to absorption of air into the water is to use an internal rubber bladder to separate the air from the water. This method has the drawback of being costly to manufacture and purchase, and when the bladder wears out, it is costly to purchase and reinstall.

Yet another method is to use a float that opens a vent to allow air out of the tank for filling purposes and then, at a predetermined float level, shuts off the vent, leaving a portion of the tank full of air. Through continued filling of the tank, the remaining air trapped in the tank compresses, storing the energy for future use.

Systems using a pressure tank typically employ an air volume control valve within the tank to release excess air introduced into the system and maintain a proper volume of air within the tank. Prior art air volume control valves usually comprise a tube extending into the pressure tank to allow airflow into or out of the pressure tank. This tube includes a restricted orifice disposed in its lower end. A float assembly positioned beneath the orifice prevents airflow out of the tank through this orifice when the water level within the tank is sufficiently high to force the float against the orifice. Similarly, when the water level in the tank is sufficiently low, the force of gravity causes the float to fall to a lowered position away from the orifice permitting excess air to flow out of the tank.

One drawback to this method is that the float is not buoyant enough to completely seal off the valve. A problem experienced with prior art air volume control valves is that, due to submersion in water or other liquid, corrosion, mineral deposits, sediment, and other solids in the water may plug the orifice and prevent proper venting of air form the tank. Should this happen, air may be trapped within the tank. This trapped air may displace the water in the tank, lowering the water level and causing the system to function poorly. Thus, it is desirable to provide an improved air volume control valve wherein the valve orifice is not susceptible to being obstructed by sediment and other solids in the water.

It would, therefore, be desirable to provide a water system wherein the air valve is located outside the tank, and most preferably above the ground, to ensure that it is not plugged by debris or deposits. It would also be desirable to provide an improved float mechanism to ensure complete sealing of the air release port.

SUMMARY OF THE INVENTION

The present invention teaches a pressure regulated tank system for liquid storage and delivery. Although the invention is described herein with respect to a preferred embodiment comprising a buried tank for a water supply system, it will be understood by those skilled in the art that the system according to the present invention is not limited to such, and may be used in any liquid tank, either above or below ground, where pressure regulation within the tank is desired.

The present teaches a water supply system which includes an adjustable bury pressure tank having an adjustable float air volume control valve and pump control assembly. A primary object of the present invention is to provide an improved pitiless water system for dwellings and the like. Another object of the present invention is to provide an adjustable depth bury pressure tank for a pitless water system. A further object of the present invention is to provide an improved air volume control valve wherein the valve orifice is not susceptible to being obstructed by sediment and other solids suspended in the water within the pressure tank. It is another object of the present invention to provide a water supply system which may be adapted for use under a wide variety of climatic conditions and water well types. It is yet another object of the present invention that the water supply system be economical to manufacture, install, and operate.

In fulfillment of these objects, the present invention provides an adjustable depth pressure tank water supply system according to the present invention. Although the present invention may advantageously employ all types of tanks, it is especially advantageous when employing tanks that are buried below ground, e.g., beneath the frost line to prevent freezing. This pressure tank is coupled to a casing pipe having a water pump housed within its lower end. A water pipe, disposed within the casing pipe, is connected to the water pump so that the pump may pump water from the casing pipe through the water pipe into the pressure tank. An air volume control assembly is provided for use with the pressure tank. The air volume control assembly comprises an adjustable length valve pipe which is coupled to the pressure tank. This valve pipe includes an adjustable length float casing mounted coaxially therein. A float is attached to the lower end of the adjustable length float casing. The float moves an adjustable length float pipe, housed coaxially within the adjustable length float casing, to engage a valve. The valve is connected to the upper end of the adjustable length valve pipe and is preferably located above ground outside of the pressure tank.

When the present invention employs a bury tank to be employed at various ground depths, it is an important feature of this invention that the tank is separable from the vertical riser and various component lengths within the air valve. These separable components enable the tank to be interchangeable with selectable length risers and enables a wide range of bury depths all using the same tank, float, and valve.

BRIEF DESCRIPTION OF THE DRAWINGS

These and other objects of the present invention will become apparent upon reading the following detailed description and upon reference to the drawings, in which:

FIG. 4A is a partial sectional elevational view of the float assembly of the present invention wherein the float valve is open allowing water to enter the pressure tank;

FIG. 4B is a partial sectional elevational view of the air volume control assembly of the present invention wherein the air volume control assembly valve is closed allowing air pressure to build to a preselected value so water contained in the pressure vessel may be forced under pressure into a dwelling or the like;

DETAILED DESCRIPTION OF AN EXEMPLARY EMBODIMENT

While the invention is described herein in connection with a preferred embodiment, it will be understood it is not intended to limit the invention to this embodiment. On the contrary, it is intended to cover all alternatives, modifications and equivalents as may be included within the spirit and scope of the invention as defined by the appended claims.

Figure 1A:
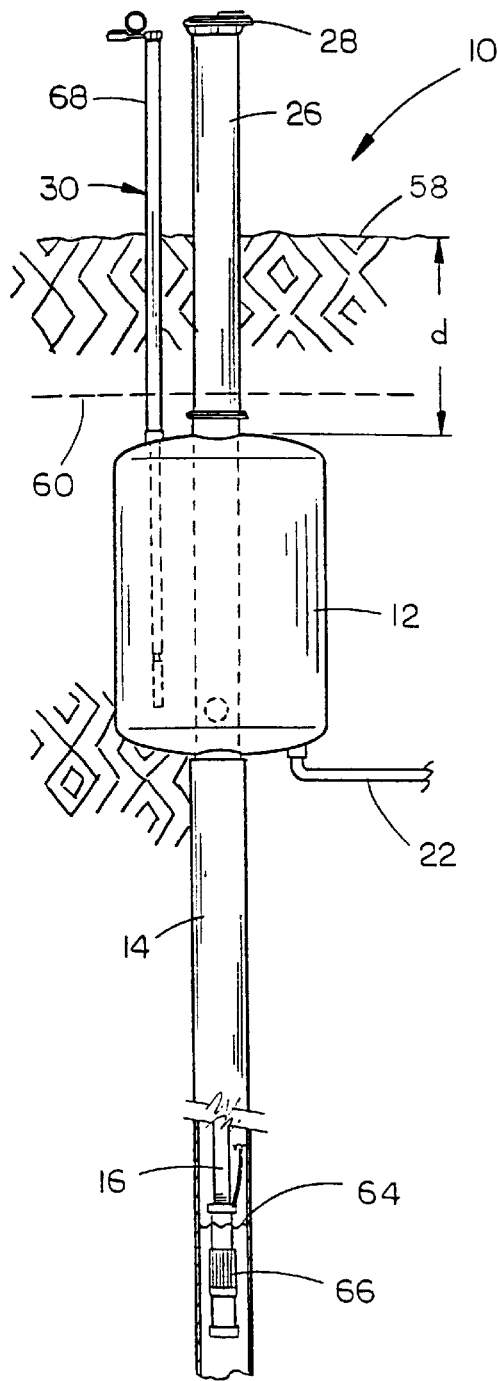
FIG. 1A is a partially sectional elevational view of the water well system of the present invention in a climate having a relatively shallow winter or permanent frost line.
Figure 1B:
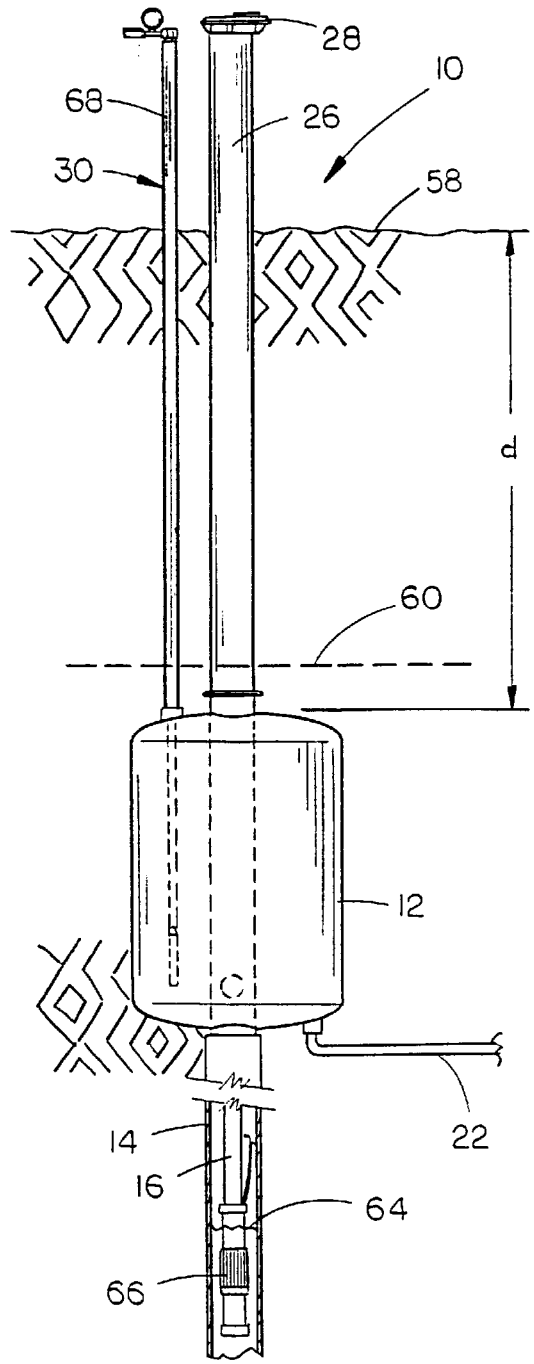
FIG. 1B is a partially sectional elevational view of the water well system of the present invention in a climate having a relatively deep winter or permanent frost line.

A. reference Characters and Numerals In Drawings d depth of pressure tank (FIGS. 1A and 1B)

10 adjustable depth pressure tank water system (FIGS. 1A and 1B)

12 pressure tank (FIGS. 1A, 1B, 2, and 3).

Figure 3:
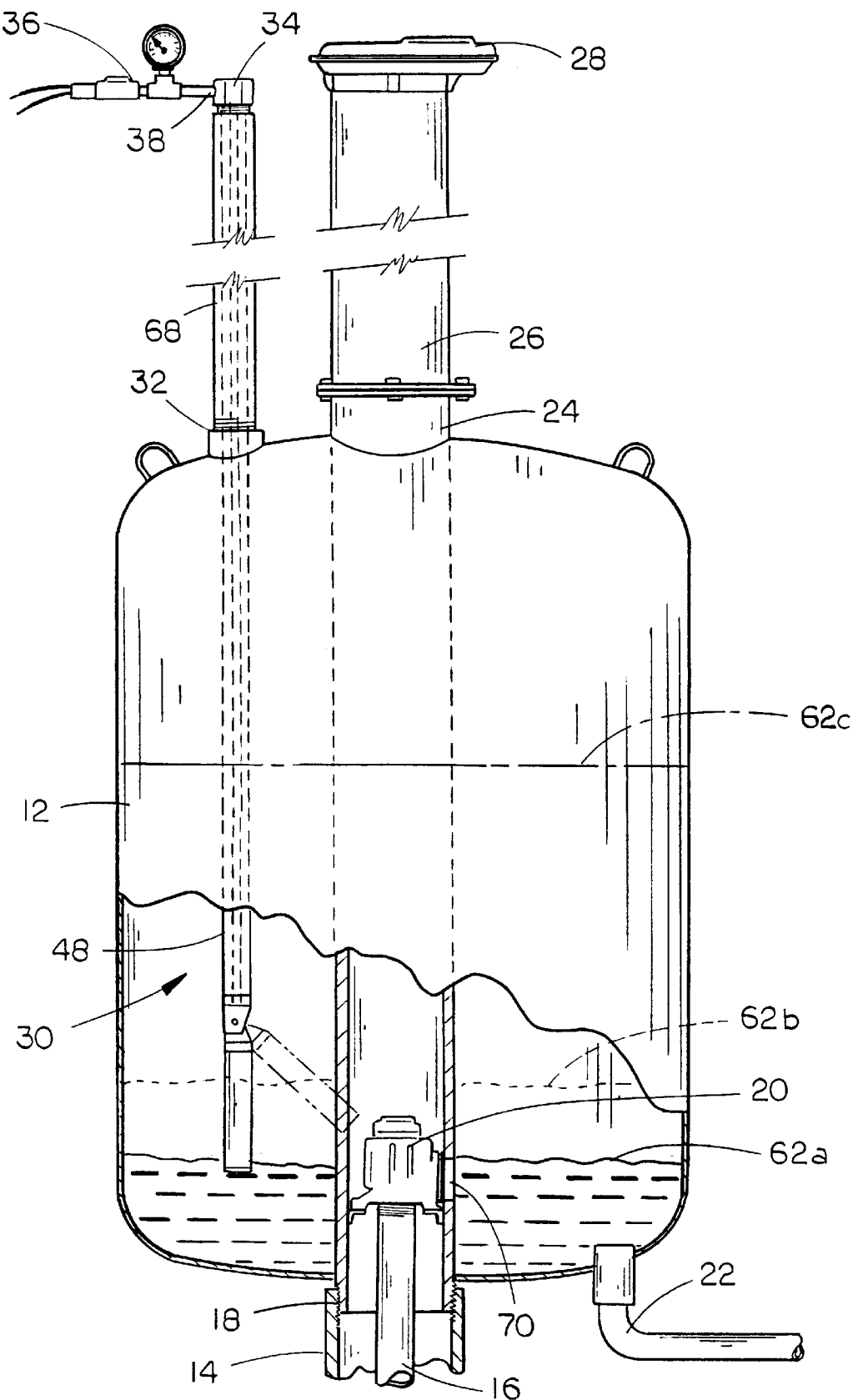
FIG. 3 is a partial sectional elevational view of the pressure tank assembly of the present invention.

14 casing pipe (FIGS 1A, 1B, and 3).

16 water pipe (FIGS. 1A, 1B, and 3).

Figure 2:
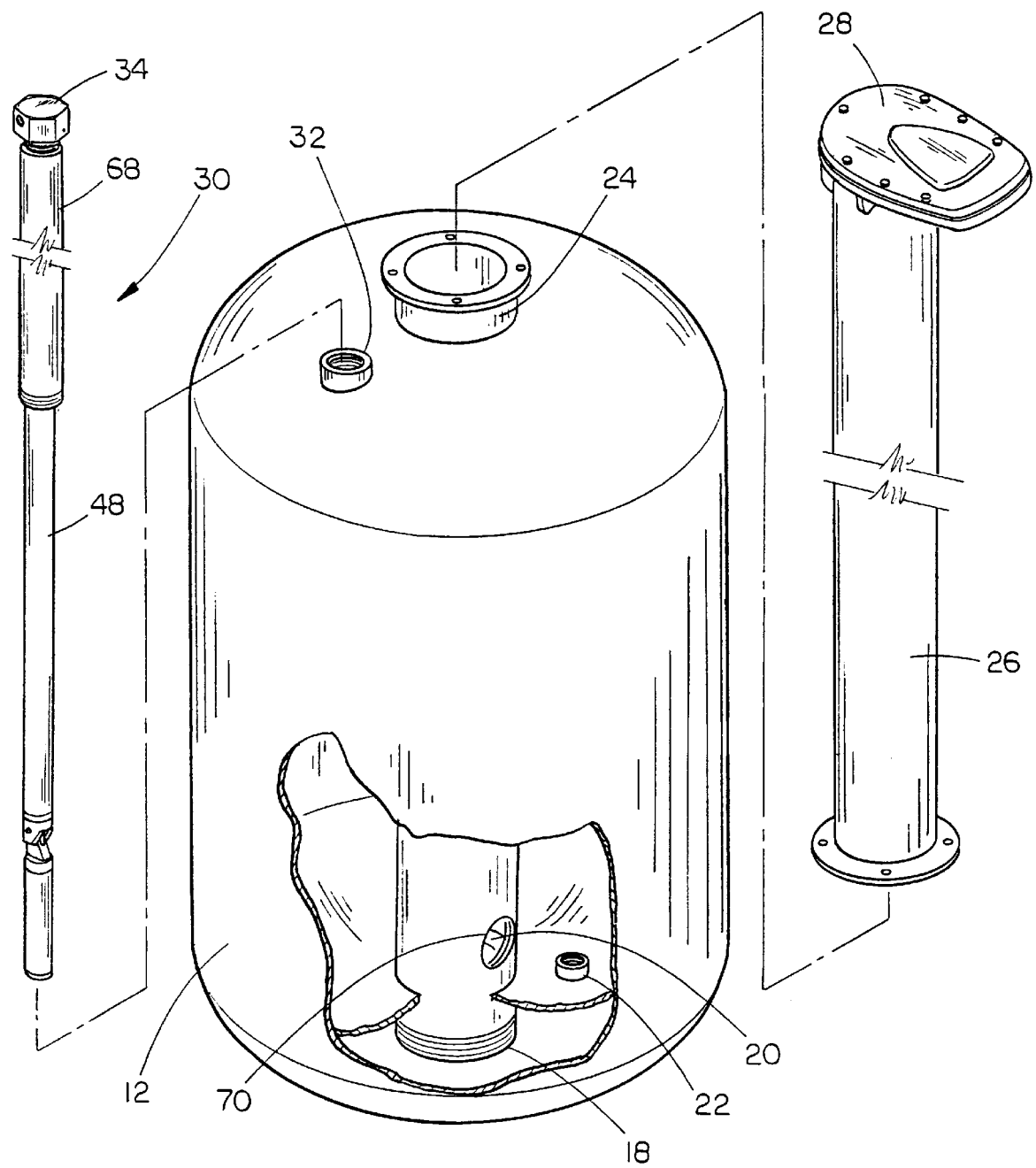
FIG. 2 is a partial sectional and exploded perspective view of the pressure tank assembly of the present invention.

18 pressure tank casing pipe coupler (FIGS. 2 and 3).

20 pitless unit (water pipe coupler) (FIGS. 2 and 3).

22 system feed port (FIGS. 1A, 1B, 2, and 3).

24 pressure tank casing vent coupler (FIGS. 2 and 3).

26 adjustable length pressure tank vent casing (FIGS. 1A, 1B, 2, and 3).

28 ventilated cap (FIGS. 1A, 1B, 2, and 3).

30 air volume control assembly (FIGS. 1A, 1B, 2, 3, 4A, and 4B).

32 pressure tank air volume control assembly coupler (FIGS. 2 and 3).

34 air volume control assembly valve (FIGS. 2, 3, 4B, and 5–7).

36 pressure switch and gauge (FIG. 3).

38 pressure switch valve coupler (FIG. 3).

40 pressure switch air port (FIGS. 4A, 4B, 6, and 7).

42 valve air pressure bleed port (FIGS. 4A, 4B, and 5–7).

Figures 4A, 4B:
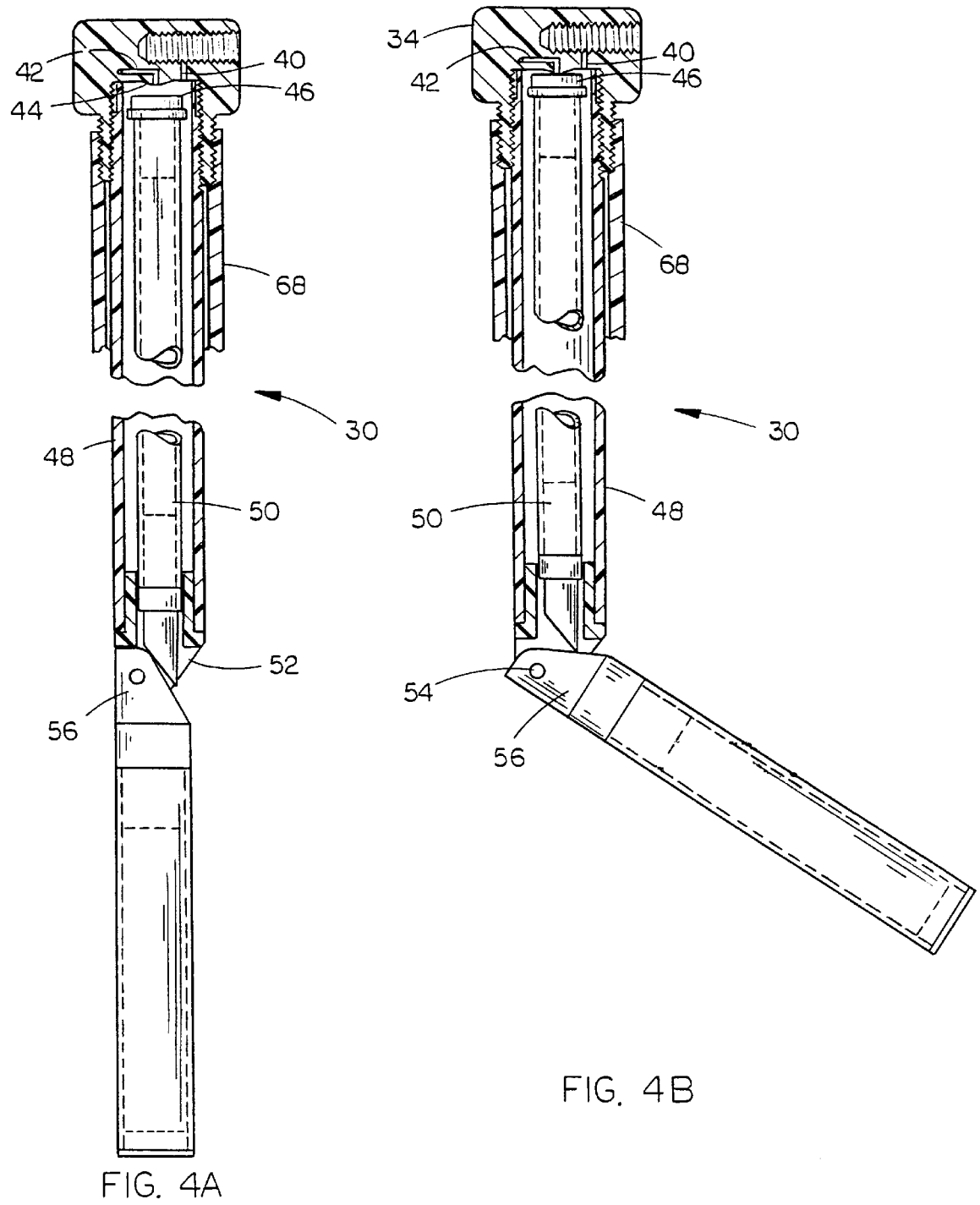
Figure 6:
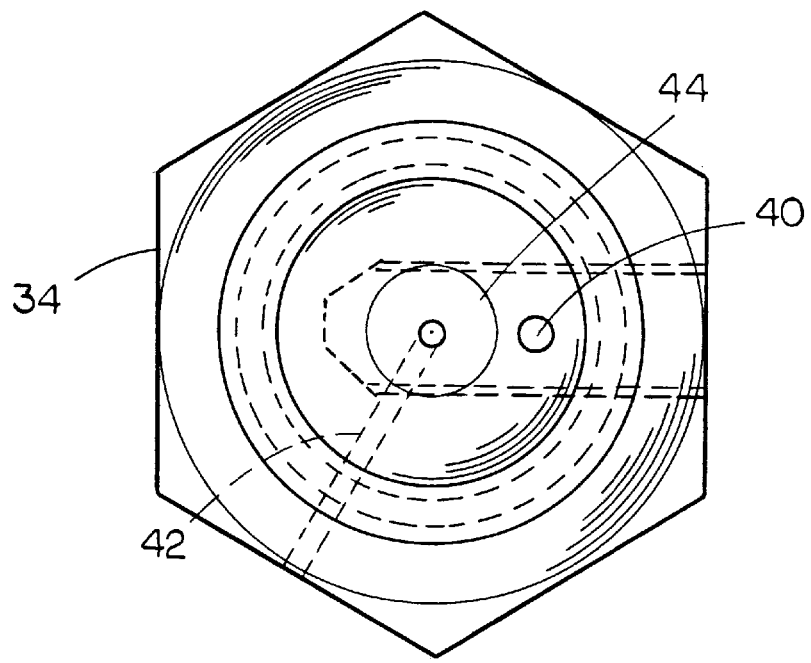
FIG. 6 is a top plan view of the air volume control assembly valve.

44 valve boss (FIGS. 4A and 6).

46 float gasket (FIGS. 4A, 4B, 5, and 7).

48 adjustable length float casing (FIGS. 2, 3, 4A, 4B, 5, and 7).

50 adjustable length float pipe (FIGS. 4A, 4B, 5, and 7).

Figure 5:
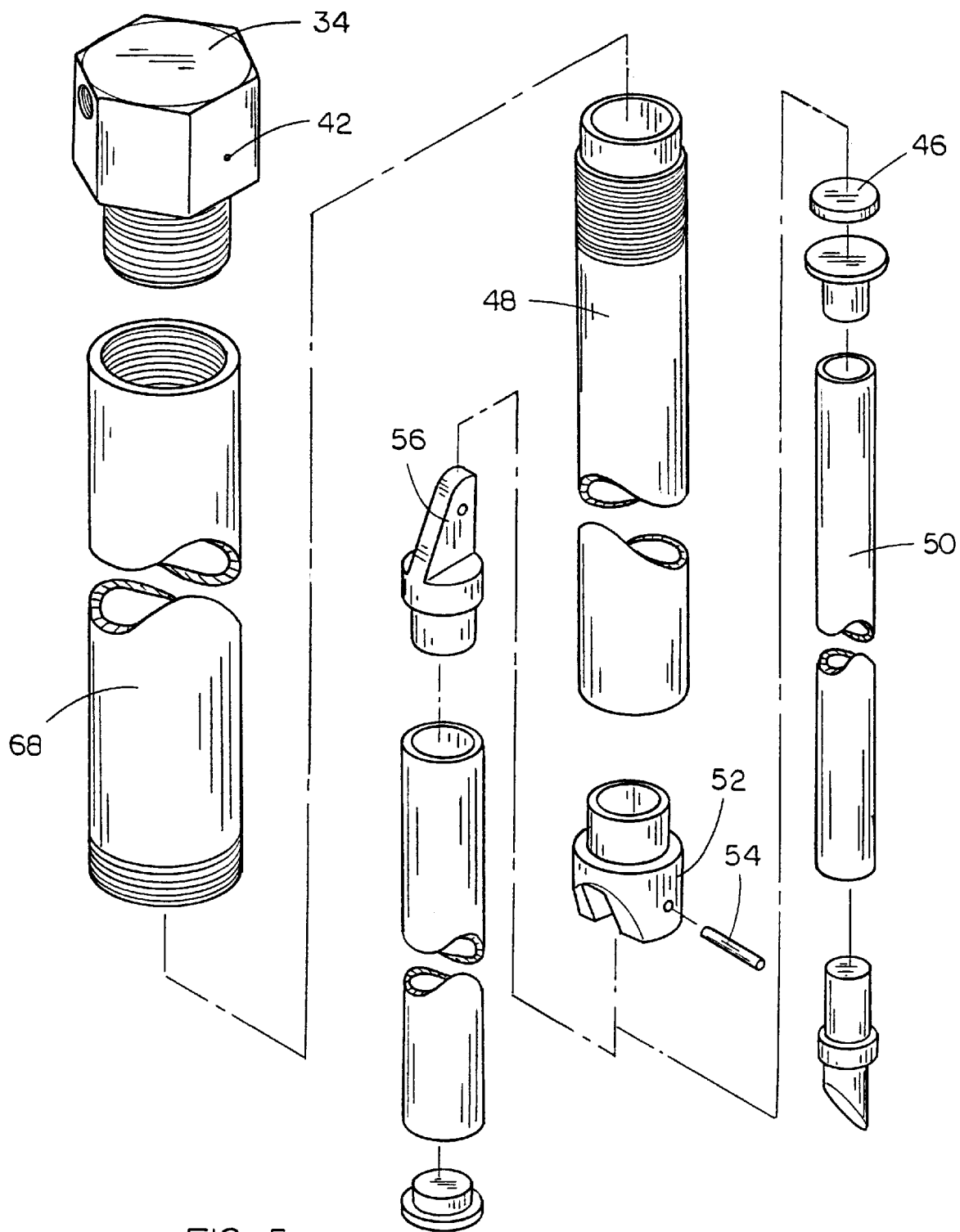
FIG. 5 is an exploded perspective view of the air volume control assembly of the present invention.

52 float hinge (FIGS. 4A and 5).

54 float hinge pin (FIGS. 4B and 5).

56 float (FIGS. 4A, 4B, and 5).

58 ground surface (FIGS. 1A and 1B).

60 frost line (FIGS. 1A and 1B).

62a pressure tank low water line (FIG. 3).

62b pressure tank float activation water line (FIG. 3).

62c pressure tank high water line (FIG. 3).

64 water well water line (FIGS. 1A and 1B).

66 pump (FIGS. 1A and 1B).

68 adjustable length valve pipe (FIGS. 1A, 1B, 2, 3, 4A, 4B, and 5).

70 water outlet aperture (FIGS. 2 and 3).

B. Description of an Exemplary System

An exemplary system of the present system 10 includes a pressure tank 12 designed to be buried below the frost line 60. The depth d of pressure tank 12 below the ground surface 58 may be adjusted by adjusting the length of the adjustable length pressure tank vent casing 26, the adjustable length float casing 48, adjustable length float pipe 50, and adjustable length valve pipe 68. In this fashion, the present system 10 may be adapted for use in a wide variety of climatic conditions.

To install an exemplary system 10, a well is drilled with casing pipe 14 installed forming an annular space wherein the water pipe 16 and pump 66 reside. The pump 66 is connected to the lower end of the water pipe 16 below well water line 66 and the upper end of the water pipe 16 is connected to the pitless unit (pressure tank water pipe couple) 20. The pitless unit 20 is contained within a casing pipe coupler 18 having a water outlet aperture 70 within a pressure tank 12. The pressure tank 12 includes an outlet port (plumbing feed) 22 for providing pressurized water for feeding a plumbing system in a rural dwelling or the like.

The casing pipe 14 (most commonly five inches in diameter) extends through the pressure tank 12 and forms a coupler 24 above and outside of the pressure tank 12 (FIGS. 2 and 3). An adjustable length pressure tank vent casing pipe 26 may then be attached to the coupler 24 such that approximately four feet of the casing extends above the ground surface 58 when the pressure tank is buried below the frost line 60. The pressure tank vent casing 26 top extends above the ground surface 58 and is connected to a ventilated cap (pressure tank casing vent) 28 which allows venting and prevents adulterants, vermin, debris, or the like from entering the system 10.

Pressure tank 12 pressure and pump 66 control are provided via an air volume control assembly 30 (FIGS. 4A and 4B). The air volume control assembly 30 includes a valve 34 having connected thereto via a coupler 38 (in an exemplary embodiment) a valve pressure switch and gauge 36 (FIG. 3). The valve 34 is connected to an adjustable length valve pipe 68 which is connected to the pressure tank 12 via a air volume control assembly tank coupler 32. Also connected to the valve 34 is an adjustable length float casing pipe 48 which forms an annular space wherein a float pipe 50 resides. Connected to the float casing 48 is a float 56 via a hinge 52 turning about a hinge pin 54. Although the air volume control assembly 30 is depicted above ground level 58, whereby the valve 34 may be prevented from clogging and is most easily serviceable, in an embodiment not shown, the air volume control assembly 30 may be below ground level, for example, in an enclosure which keeps the valve 34 free of debris, allows access for servicing, and the like.

In an alternative embodiment, not shown) float 56 and/or float casing 48 may be made freely rotatable about the axis of float casing 48 to ensure that float 56 does not hit the pressure tank casing during servicing of the float and valve device.

Figure 7:
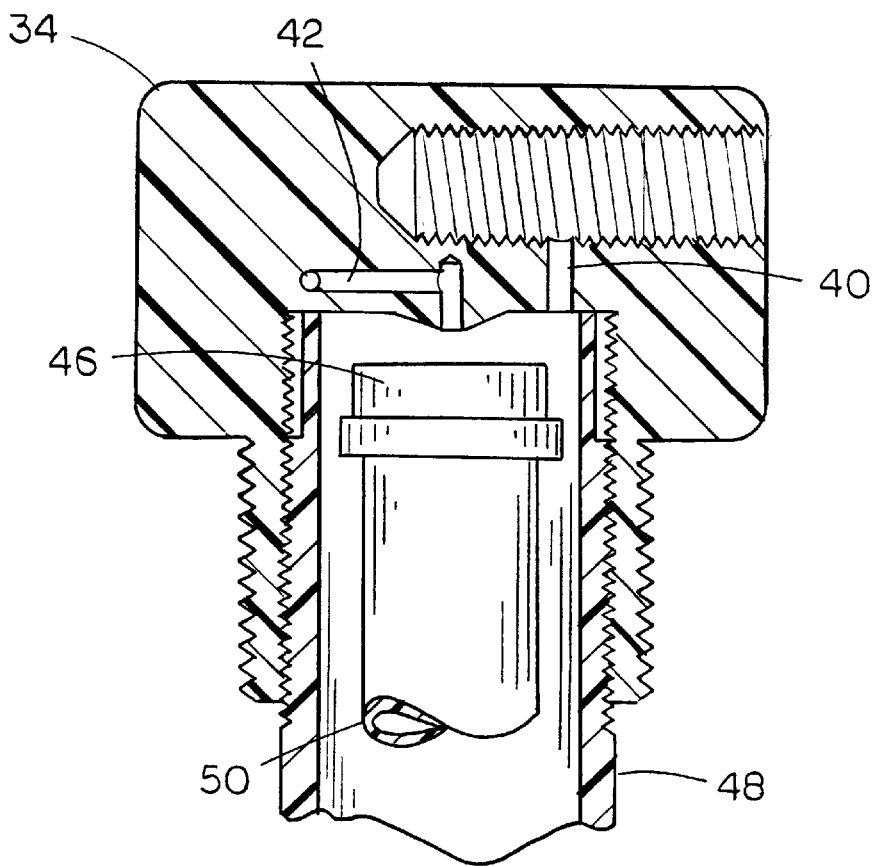
FIG. 7 is a sectional elevational view of the air volume control assembly valve.

The float pipe 50 has a rubber gasket 46 at its top for coaction with the valve boss 44 of the valve 34 (FIGS. 6 and 7). The valve boss 44 surrounds the valve air pressure bleed port 42 which allows air, or other gases, to escape or enter the valve 34 whenever the rubber gasket 46 of the float pipe 50 is not compressed against the valve boss 44 by action of the float 56 on the float pipe 50.

In operation the pressure of the pressure tank 12 is determined by the air pressure of the air which enters the pressure switch and gauge 36 via the pressure switch air port 40. When the air pressure in the pressure tank 12 drops below a predetermined and selected value (for example 30 pounds per square inch) the pump 66 is switched on via the pressure switch and gauge 36 such that water is pumped up the water pipe 16 through the pitless unit 20 through the pressure tank casing pipe aperture 70 and into the pressure tank 12. As the water level 62a rises in the tank the float 56 acts to force the float pipe 50 up within the float casing 48 such that the rubber gasket 46 seals the valve air pressure bleed port. Although float pipe 50 may be a solid shaft, it is especially preferred that float pipe 50 is hollow such that the added buoyancy of the float pipe 50 will aid in closing off the valve 34. As water continues to rise, for example, to level 62b, within the pressure tank 12 air pressure increases within the system 10 such that water in the pressure tank 12 is under pressure and available for use via the pressure tank outlet 22. When the water level reaches a level, for example level 62c, the air pressure in the tank has increased to a maximum desired level (for example 90 pounds per square inch), and the pressure switch and gauge 36 shuts off the pump 66.

As water is utilized from the system 10 via the pressure tank outlet 22 pressure in the pressure tank drops. When the air pressure drops below the preselected limit the pump is turned on for another cycle. In this manner water may be supplied to a rural dwelling or the like which may have a locus in any climate.

Thus, there has been described an exemplary embodiment of the system according to the present invention which meets at least all of the stated objects. It should be apparent to those of skill in the art that the present invention may be modified in many ways not limited to the construction of the float and valve assembly, attachment of the water pipe within the pressure tank, and the adaptability of the system to preexisting wells. Therefore, although the present invention has been described in detail it is not intended that the invention be construed narrowly as defined by this exemplary system, but should be construed in breadth according to the following appended claims which set forth the scope of the invention herein.

What is claimed is:

1. A pressure tank liquid supply system comprising
   (a) a casing pipe;
   (b) a pump within a lower end of said casing pipe;
   (c) a pipe within said casing pipe connected to said pump;
   (d) a vented pressure tank coupled to said casing pipe; and
   (e) a gas volume control assembly comprising a valve pipe coupled to said pressure tank having a valve connected to the upper end of said valve pipe, a float casing mounted coaxially within said valve pipe having a float attached to a first lower end of said float casing, and a shaft axially movable within said float casing to engage said valve.

2. An adjustable depth pressure tank liquid supply system comprising
   (a) a casing pipe;
   (b) a pump within a lower end of said casing pipe;
   (c) a pipe within said casing pipe connected to said pump;
   (d) a vented pressure tank coupled to said casing pipe; and
   (e) a gas volume control assembly comprising an adjustable length valve pipe coupled to said pressure tank having a valve connected to the upper end of said adjustable length valve pipe, an adjustable length float casing mounted coaxially within said adjustable length valve pipe having a float attached to a first lower end of said adjustable length float casing, and an adjustable length shaft axially movable within said adjustable length float casing to engage said valve.

3. An adjustable depth pressure tank water supply system comprising
   (a) a casing pipe;
   (b) a water pump within a lower end of said casing pipe;
   (c) a water pipe within said casing pipe connected to said pump;
   (d) a vented pressure tank coupled to said casing pipe; and
   (e) an air volume control assembly comprising an adjustable length valve pipe coupled to said pressure tank having a valve connected to the upper end of said adjustable length valve pipe, an adjustable length float casing mounted coaxially within said adjustable length valve pipe having a float attached to a first lower end of said adjustable length float casing, and an adjustable length shaft axially movable within said adjustable length float casing to engage said valve.

4. The adjustable depth pressure tank water supply system of claim 3 wherein said air volume control assembly further comprises an air pressure bleed port disposed in said valve to allow air to escape or enter said vented pressure tank.

5. The adjustable depth pressure tank water supply system of claim 4 wherein said air volume control assembly further comprises a valve boss surrounding said air pressure bleed port.

6. The adjustable depth pressure tank water supply system of claim 5 wherein said air volume control assembly further comprises a gasket disposed on an upper end of said adjustable length shaft, said gasket coacting with said valve boss to at least partially seal said air pressure bleed port when said gasket is compressed against said valve boss by action of said float on said adjustable length shaft.

7. The adjustable depth pressure tank water supply system of claim 3 wherein said air volume control assembly further comprises a valve pressure switch connected to said valve via a coupler, said valve pressure switch activating said water pump when the air pressure in said vented pressure tank decreases below a predetermined minimum pressure and deactivating said water pump when the air pressure in said vented pressure tank increases above a predetermined maximum pressure.

8. The adjustable depth pressure tank water supply system of claim 7 further comprising an air pressure gauge.

9. The adjustable depth pressure tank water supply system of claim 7 wherein said predetermined minimum pressure ranges from about 20 to about 40 pounds per square inch and said predetermined maximum pressure ranges from about 60 to about 120 pounds per square inch.

10. The adjustable depth pressure tank water supply system of claim 9 wherein said predetermined minimum pressure is about 30 pounds per square inch and said predetermined maximum pressure is about 90 pounds per square inch.

11. The adjustable depth pressure tank water supply system of claim 3 wherein said adjustable length float shaft is hollow.

12. The adjustable depth pressure tank water supply system of claim 3 wherein the float and/or the adjustable length valve pipe are rotatable about an axis of the adjustable length valve pipe.

13. An adjustable depth pressure tank water supply system comprising
   (a) a casing pipe;
   (b) a vented pressure tank coupled to said casing pipe;
   (c) a water pipe within said casing pipe, said water pipe coupled to said vented pressure tank;
   (d) a water pump within the lower end of said casing pipe, said water pump connected to said water pipe; and
   (e) an air volume control assembly comprising an adjustable length valve pipe coupled to said pressure tank, a valve connected to an upper end of said adjustable length valve pipe, said valve including an air pressure bleed port to allow air to escape or enter said valve, an adjustable length float casing mounted coaxially within said adjustable length valve pipe, a float pivotally attached to a lower end of said adjustable length float casing, and an adjustable length shaft axially movable within said adjustable length float casing to engage said valve so as to open and close said air pressure bleed port.

14. The adjustable depth pressure tank water supply system of claim 13 wherein said valve further comprises a valve boss surrounding said air pressure bleed port.

15. The adjustable depth pressure tank water supply system of claim 14 wherein said air volume control assembly further comprises a gasket disposed on an upper end of said adjustable length shaft, said gasket coacting with said valve boss to at least partially seal said air pressure bleed port when said gasket is compressed against said valve boss by action of said float on said adjustable length shaft.

16. The adjustable depth pressure tank water supply system of claim 13 further comprising a valve pressure switch connected to said valve via a coupler, said valve pressure switch activating said water pump when the air pressure in said vented pressure tank decreases below a predetermined minimum pressure and deactivating said water pump when the air pressure in said vented pressure tank increases above a predetermined maximum pressure.

17. The adjustable depth pressure tank water supply system of claim 16 further comprising an air pressure gauge.

18. The adjustable depth pressure tank water supply system of claim 16 wherein said predetermined minimum pressure ranges from about 20 to about 40 pounds per square inch and said predetermined maximum pressure ranges from about 60 to about 120 pounds per square inch.

19. The adjustable depth pressure tank water supply system of claim 16 wherein said predetermined minimum pressure is about 30 pounds per square inch and said predetermined maximum pressure is about 90 pounds per square inch.

20. The adjustable depth pressure tank water supply system of claim 13 wherein said adjustable length float shaft is hollow.

21. The adjustable depth pressure tank water supply system of claim 13 wherein the float and/or the adjustable length valve pipe are rotatable about an axis of the adjustable length valve pipe.

22. An adjustable depth pressure tank system comprising:
   (a) a plurality of casing pipes having different lengths;
   (b) a pump capable of being operably mounted within a lower end of any of said casing pipes;
   (c) a plurality of liquid conveying pipes having different lengths, each of said liquid conveying pipes capable of being operably mounted within one of said casing pipes having a corresponding similar length, each of said plurality of liquid conveying pipes being capable of being operably connected to said pump;
   (d) a plurality of valve pipes having different lengths, each capable of being operably coupled to said pressure tank;
   (e) a valve capable of being operably connected to the upper end of any of said valve pipes;
   (f) a plurality of float casings having different lengths, each of said float casings capable of being operably mounted coaxially within one of said valve pipes having a corresponding similar length;
   (g) a float capable of being operably attached to a first lower end of any of said float casings;
   (h) a plurality of shafts having differing lengths, each shaft capable of being axially movably mounted within one of said float casings having a corresponding similar length, to engage said valve; and
   (i) a vented pressure tank capable of being operably coupled to any of said casing pipes;
wherein said plurality of casing pipes, said plurality of liquid conveying pipes, said plurality of valve pipes, said plurality of float casings, and said plurality of shafts are user selectable to provide an adjustable depth pressure tank system which may be installed underground at a predetermined, user-selected depth.

23. A method for providing an adjustable depth pressure tank system comprising the steps of:

(a) a providing a plurality of casing pipes having different lengths;

(b) providing a pump capable of being operably mounted within a lower end of any of said casing pipes;

(c) providing a plurality of liquid conveying pipes having different lengths, each of said liquid conveying pipes capable of being operably mounted within one of said casing pipes having a corresponding similar length, each of said plurality of liquid conveying pipes being capable of being operably connected to said pump;

(d) providing a plurality of valve pipes having different lengths, each capable of being operably coupled to said pressure tank;

(e) providing a valve capable of being operably connected to the upper end of any of said valve pipes;

(f) providing a plurality of float casings having different lengths, each of said float casings capable of being operably mounted coaxially within one of said valve pipes having a corresponding similar length;

(g) providing a float capable of being operably attached to a first lower end of any of said float casings;

(h) providing a plurality of shafts having differing lengths, each shaft capable of being axially movably mounted within one of said float casings having a corresponding similar length, to engage said valve;

(i) providing a vented pressure tank capable of being operably coupled to any of said casing pipes; and (j) selecting one of said plurality of casing pipes, one of said plurality of liquid conveying pipes, one of said plurality of valve pipes, one of said plurality of float casings, and one of said plurality of shafts;

wherein the selection of said plurality of casing pipes, the selection of said plurality of liquid conveying pipes, the selection of said plurality of valve pipes, the selection of said plurality of float casings, and the selection of said plurality of shafts, are made according to length in order to provide a pressure tank system which may be installed underground at a predetermined, user-selected depth.

* * * * *